United States Patent
Tong et al.

(10) Patent No.: US 10,790,559 B2
(45) Date of Patent: *Sep. 29, 2020

(54) BATTERY PACK AND BATTERY PACK SYSTEM

(71) Applicant: Microvast Power Systems Co., Ltd., Huzhou, Zhejiang Province (CN)

(72) Inventors: Zhiming Tong, Huzhou (CN); Hui Li, Huzhou (CN); Lingyan Fu, Huzhou (CN)

(73) Assignee: MICROVAST POWER SYSTEMS CO., LTD., Huzhou, Zhejiang Province (CN)

(*) Notice: Subject to any disclaimer, the term of this patent is extended or adjusted under 35 U.S.C. 154(b) by 329 days.

This patent is subject to a terminal disclaimer.

(21) Appl. No.: 15/751,873

(22) PCT Filed: Aug. 14, 2015

(86) PCT No.: PCT/CN2015/087039
§ 371 (c)(1),
(2) Date: Feb. 11, 2018

(87) PCT Pub. No.: WO2017/028033
PCT Pub. Date: Feb. 23, 2017

(65) Prior Publication Data
US 2018/0233791 A1   Aug. 16, 2018

(51) Int. Cl.
*H01M 10/6568* (2014.01)
*H01M 10/613* (2014.01)
(Continued)

(52) U.S. Cl.
CPC ..... *H01M 10/6568* (2015.04); *H01M 2/1072* (2013.01); *H01M 2/12* (2013.01);
(Continued)

(58) Field of Classification Search
None
See application file for complete search history.

(56) References Cited

U.S. PATENT DOCUMENTS

2009/0176148 A1* 7/2009 Jiang .................. H01M 6/5038
429/120
2012/0003515 A1   1/2012 Eisenhour
(Continued)

FOREIGN PATENT DOCUMENTS

CN   101542806 A   9/2009
CN   201466117 U   5/2010
(Continued)

*Primary Examiner* — Rena Dye Cronin
(74) *Attorney, Agent, or Firm* — Cheng-Ju Chiang

(57) ABSTRACT

A battery pack relating to the field of batteries includes a battery module, a coolant and a battery box. The battery module and the coolant are disposed in the battery box. The battery module is at least partially immersed in the coolant. A sealing layer containing a barrier liquid is covered on the coolant. The heat generated by the battery cell which occurs thermal runaway is taken away rapidly by using the vaporization latent heat of the coolant, to thereby avoid heat accumulation and prevent propagation of thermal runaway among battery cells, thereby protecting the safety of the battery pack.

18 Claims, 3 Drawing Sheets

(51) Int. Cl.

| | |
|---|---|
| *H01M 8/04* | (2016.01) |
| *H01M 10/647* | (2014.01) |
| *H01M 10/6569* | (2014.01) |
| *H01M 10/625* | (2014.01) |
| *H01M 2/10* | (2006.01) |
| *H01M 2/12* | (2006.01) |

(52) U.S. Cl.
CPC ........... *H01M 8/04* (2013.01); *H01M 10/613* (2015.04); *H01M 10/625* (2015.04); *H01M 10/647* (2015.04); *H01M 10/6569* (2015.04); *H01M 2220/20* (2013.01)

(56) References Cited

U.S. PATENT DOCUMENTS

2014/0065461 A1* 3/2014 Kountz ............... H01M 2/0287
429/120
2014/0335381 A1 11/2014 Krolak
2015/0188203 A1* 7/2015 Enomoto .......... H01M 10/6568
429/83

FOREIGN PATENT DOCUMENTS

| CN | 103682188 A | 3/2014 |
|---|---|---|
| CN | 103682511 A | 3/2014 |
| CN | 103996886 A | 8/2014 |
| JP | H11-40211 A | 2/1999 |
| JP | 2010-146883 A | 7/2010 |

\* cited by examiner

BATTERY PACK AND BATTERY PACK SYSTEM

CROSS REFERENCE TO RELATED APPLICATIONS

This application is a 35 U.S.C. § 371 National Phase conversion of International (PCT) Patent Application No. PCT/CN2015/087039, filed on Aug. 14, 2015. The contents of the above-identified applications are incorporated herein by reference. The PCT International Patent Application was filed and published in Chinese.

TECHNICAL FIELD

The present application relates to a battery pack capable of controlling the propagation of thermal runaway.

BACKGROUND

Lithium-ion batteries have been widely used in electric vehicles because of their high specific energy, high voltage, low self-discharge rate and long cycle life. However, because there are some potential problems with respect to the safety of lithium-ion batteries, it may lead to the temperature of some lithium-ion battery cells in a battery pack out of control due to internal short circuit, external short circuit, overcharge, mechanical damage or other reasons, and accordingly produce a high temperature at 100 to 700 Celsius degree and a lot of heat.

Heat sources leading to thermal runaway mainly include the energy conversion stored in the battery itself, the decomposition of anode material at 80~400 Celsius degree, the decomposition of cathode material at 150~400 Celsius degree, the decomposition of electrolyte at 200~400 Celsius degree and the heat generated by burning of electrolyte at high temperature. The heat will further heat up neighboring battery cells. When the neighboring battery cells are heated up to a certain extent (e.g., 130 Celsius degree), the separator used in the battery cells becomes to shrink, leading to short circuit between the positive electrode and the negative electrode inside the battery cells and leading to the neighboring battery cells to occur thermal runaway, thereby releasing more heat to eventually cause accelerated propagation of thermal runaway, resulting in the whole battery pack out of control and serious fire explosion incident.

Chinese application No. CN201210317186.4, entitled "flame-retardant explosion-proof battery pack", uses an insulating liquid such as silicone oil to partially immerse the battery pack. This is a good way to isolate the air and reduce the possibility of fire when thermal runaway occurs. However, after thermal runaway occurs in a single battery cell, the heat generated will continuously heat up the insulating silicone oil to a temperature above 200 Celsius degree. The silicone oil with high temperature will become a heat source, leading to more neighboring battery cells to be heated up to result in thermal runaway.

SUMMARY

In order to solve the above problem, the present application discloses a battery pack which includes a battery module, a coolant and a battery box. The battery module and the coolant are disposed in the battery box. The battery module is at least partially immersed in the coolant. A vaporization starting temperature of the coolant is between 70 Celsius degree and 200 Celsius degree. A sealing layer containing a barrier liquid is covered on the coolant. The barrier liquid and the coolant are immiscible. The density of the barrier liquid is less than the density of the coolant. The barrier liquid will not vaporize at a temperature below 200 Celsius degree.

By immersing the battery module at least partially in the coolant, the heat generated by the battery pack can be cooled by the coolant, and the battery pack is isolated from the air to reduce the possibility of occurring fire when thermal runaway happens to the battery pack.

Under normal conditions, the battery pack can dissipate heat in a passive way, the heat generated by the battery pack is conducted to the battery box through the coolant.

When thermal runaway occurs, the coolant is vaporized rapidly, and the generated heat in the thermal runaway is taken away by using the high vaporization latent heat, to thereby delay or avoid propagation of thermal runaway.

The barrier liquid layer covering on the coolant acts as a liquid seal. The barrier liquid is uneasy to volatilize or is not volatile. The density of the barrier liquid is less than the density of the coolant, and the barrier liquid and the coolant are immiscible. The barrier liquid is suspended above the coolant, to avoid volatilization loss of the coolant in normal working states.

In the present application, the vaporization starting temperature of the coolant refers to the temperature at which the coolant begins to vaporize after boiling.

In the present application, preferably, the coolant contains a liquid having flame-retardant, insulating and anti-electrolyzation property.

According to the object of the present application, the coolant is selected from a liquid having a vaporization starting temperature between 70 Celsius degree and 150 Celsius degree when the battery pack is under its working pressure.

In the present application, preferably, the coolant is selected from a liquid having a vaporization starting temperature between 70 Celsius degree and 130 Celsius degree when the battery pack is under its working pressure.

In the present application, preferably, the working pressure of the battery pack is between 0.2 bar and 5 bar.

The coolant has a flame-retardant and insulating property. The coolant will not be electrolyzed at the applied electrical potential and will boil above the temperature of the thermal runaway.

When thermal runaway occurs in some of the battery cells to generate high temperature, the coolant is vaporized rapidly. Usually, the vaporization has a much higher heat transfer rate than the conduction and the convection of liquid, and the vaporization latent heat of liquid is much higher than the sensible heat. Therefore, by using the high vaporization latent heat and the vaporization conduction rate of the liquid, the heat generated by the thermal runaway is taken away fully and rapidly, to control the temperature of the battery pack at a relatively low level (e.g., lower than the temperature of thermal runaway), thereby preventing the propagation of heat to more battery cells.

The battery module can be designed to work under negative pressure, normal pressure or positive pressure. The absolute range of working pressure can be between 0.2 bar and 5 bar. Corresponding to the working pressure of the battery module, the vaporization starting temperature of the coolant is between 70 Celsius degree and 150 Celsius degree. The vaporization latent heat of the coolant at standard atmospheric pressure is 25 to 2500 kJ/kg. If the battery module is designed to work at normal pressure, the coolant with a boiling point of 70 to 130 Celsius degree under atmospheric pressure is selected.

In the present application, preferably, the coolant is at least one selected from trichloromethane and hydrofluoroether.

Accordingly to another embodiment of the present application, the coolant is at least one selected from trimethyl phosphate and tripropyl phosphate.

Trichloromethane, hydrofluoroether, trimethyl phosphate and tripropyl phosphate each have a relatively low volatilization temperature, and have a relatively good insulating, flame-retardant and anti-electrolyzation property.

FIG. 5 shows the temperature curve when thermal runaway occurs in the battery pack of the present application. Firstly, the battery pack is heated up slowly by a heater mounted in the battery box, to simulate the thermal runaway process of the battery pack. Until 70 to 75 min, the temperature of the battery module reaches over 100 Celsius degree to cause local thermal runaway, and the temperature rises rapidly. At this moment, hydrofluoroether undergoes phase change and absorbs heat, to reduce the temperature of the battery module 2 below 100 Celsius degree at the moment of about 75 min. It is proved that the thermal runaway is already under control, and the propagation of the thermal runaway is inhibited.

In the present application, preferably, the barrier liquid and the coolant are immiscible, the density of the barrier liquid is less than the density of the coolant, and the barrier liquid will not vaporize at a temperature below 150 Celsius degree.

Preferably, a density difference between the coolant and the barrier liquid is greater than 0.3 kg/L.

The coolant is volatile with a certain extent. When used in a non-airtight system, the coolant may continuously reduce due to volatilization. However, the sealing layer with the barrier liquid is covered on the coolant, the barrier liquid and the coolant are immiscible, and the barrier liquid is not volatile to act as a liquid seal, thereby effectively stopping or delaying the volatilization of the coolant.

In the present application, preferably, the sealing layer has a thickness greater than 0.5 mm.

In the present application, preferably, the barrier liquid is at least one selected from silicone oil and transformer oil; more preferably, the barrier liquid is silicone oil.

FIG. 6 shows the comparative data of volatilization loss of hydrofluoroether after 60 days when it is covered with silicone oil and without silicone oil. After the sealing layer of silicone oil is covered on hydrofluoroether, hydrofluoroether in the battery box does not show a large amount of volatilization even if 60 days have passed. It is proved that the sealing layer of silicone oil has a good liquid sealing effect.

Preferably, the battery module is placed upside down in the battery box, such that the electrode tabs of the battery module are immersed in the coolant.

A battery cell is placed upside down, which means the electrode tabs of the battery cell are disposed downwards, such that the electrode tabs can be immersed in the coolant when using a small amount of the coolant. For a battery cell, the heat generation of the electrode tabs is relatively large. It is helpful for dissipating heat by immersing the electrode tabs in the coolant, and it is also helpful to insulate the battery module.

For pouch cells, the packaging position of the electrode tabs is relatively easy to break, and the active materials inside the battery is easy to leak out from the break. Placing the battery cell upside down can prevent the leaked materials from being exposed in the air. Once leakage happens, the active materials flow into the coolant quickly, thereby improving the safety performance.

In the present application, preferably, the battery box is provided with a breathing valve.

The breathing valve provided on the battery box can balance the internal pressure of the battery box with the external atmospheric pressure in time, to prevent the battery box from being subjected to excessive positive pressure or negative pressure when the battery temperature varies.

The present application further provides a battery pack system which includes the above-mentioned battery pack. The battery pack system further includes an external circulating system. The external circulating system is connected to the battery box through a circulating pipeline, and the coolant in the battery box is circulated through the external circulating system.

According to an embodiment of the present application, the external circulating system includes a circulating pump, a heat exchanger, a buffer tank and a circulating pipeline, wherein the battery box, the circulating pump, the heat exchanger and the buffer tank are connected together using the circulating pipeline.

According to another embodiment of the present application, the buffer tank has an opened structure, the buffer tank is filled with the coolant, and another sealing layer containing the barrier liquid is covered on the coolant of the buffer tank.

The buffer tank with the opened structure can buffer the volume change of the coolant and the barrier liquid caused by temperature change. The structure is simple and effective.

In the present application, the battery module is added with the coolant. Due to the coolant being capable of boiling and vaporizing rapidly at a particular temperature, the heat generated by some of the battery cells during thermal runaway can be taken away quickly to prevent propagation of high temperature to neighboring battery cells, to thereby protect the safety of the battery pack. Further, by covering a layer of less volatile barrier liquid on the coolant, a good sealing effect is realized to avoid the volatilization loss of the coolant in the battery pack. The structure is simple, easy to implement in industry and has better safety performance.

battery box: 1, coolant: 11, sealing layer: 12, breathing valve: 13, coolant inlet: 14, coolant outlet: 15, battery pack: 2, circulating pipeline: 3, circulating pump: 31, heat exchanger: 32, buffer tank: 33.

DETAILED DESCRIPTION OF PREFERRED EMBODIMENTS

The present application is described in detail with the following specific embodiments, but the present application is not limited to the following embodiments.

Embodiment 1

Figure 1:
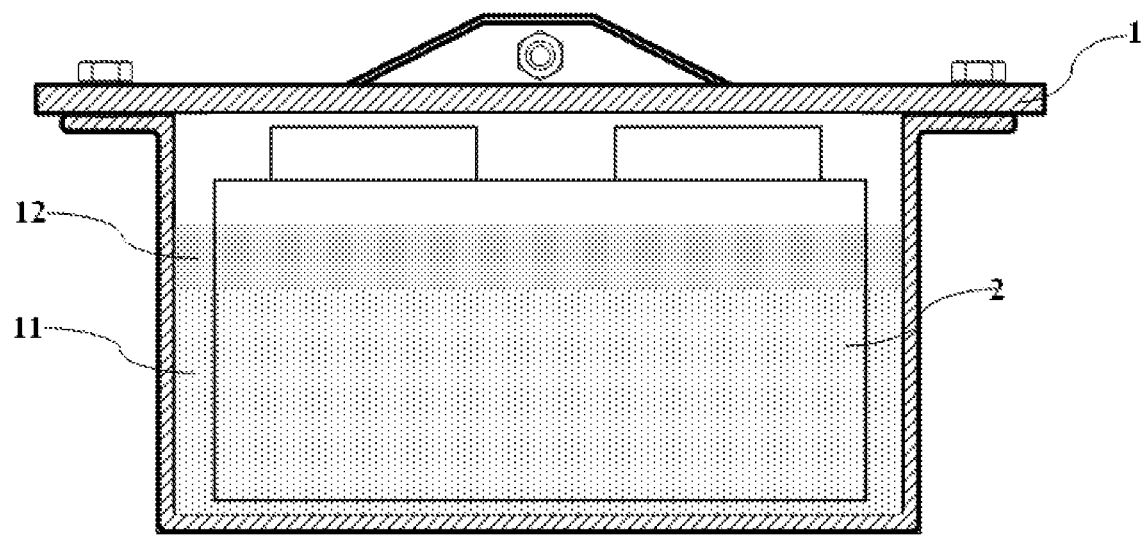
FIG. 1 is a schematic view of a battery pack of the present application.

Referring to FIG. 1, the present application discloses a battery pack which includes a battery module 2, a coolant 11 and a battery box 1. The battery module 2 consists of battery cells, and the battery module 2 is disposed in the battery box 1. The coolant 11 is filled into the battery box 1, such that the battery module 2 is immersed in the coolant 11. Then, a barrier liquid is added to form a sealing layer 12 covering on the coolant 11. The sealing layer 12 covering on the coolant 11 can have a thickness of 0.5 mm, to avoid the volatilization loss of the coolant 11 for achieving a liquid sealing effect.

In the present embodiment, the coolant 11 is hydrofluoroether, and the barrier liquid is silicone oil.

Embodiment 2

Figure 2:
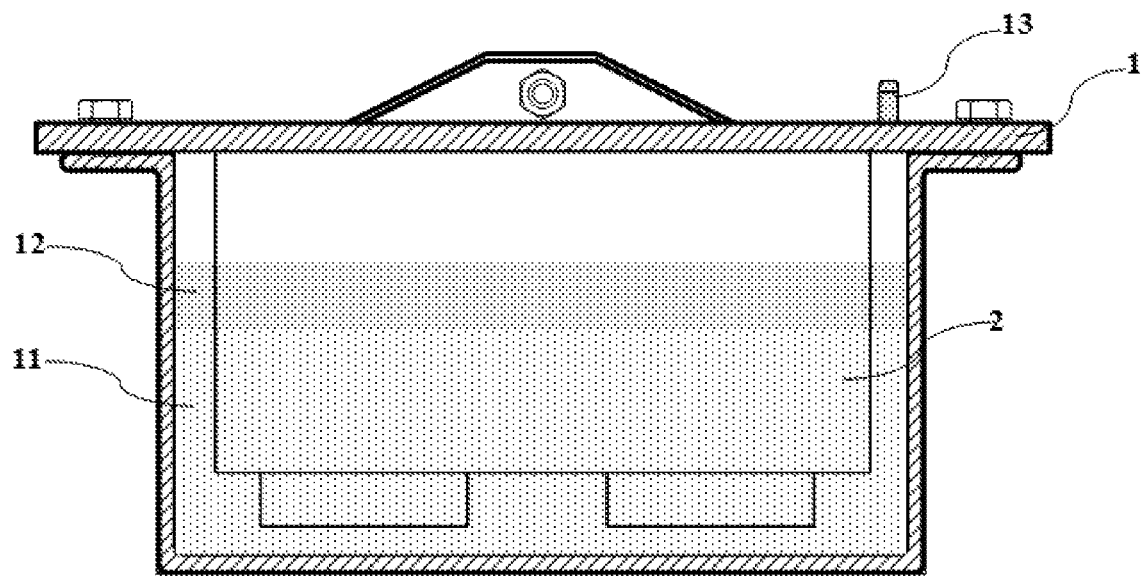
FIG. 2 is a schematic view of another battery pack of the present application.

Referring to FIG. 2, the present application discloses a battery pack which includes a battery module 2, a coolant 11 and a battery box 1. The internal pressure in the battery box 1 is 0.2 bar. The battery module 2 consists of battery cells, and the battery module 2 is disposed in the battery box 1. The battery module 2 is placed upside down in the battery box 1.

The coolant 11 is filled into the battery box 1, such that the electrode tabs of the battery module 2 are immersed in the coolant 11. Then, a barrier liquid is added to form a sealing layer 12 covering on the coolant 11. The sealing layer 12 covering on the coolant 11 can have a thickness of 1 mm, to avoid the volatilization loss of the coolant 11 for achieving a liquid sealing effect.

The battery box 1 is provided with a breathing valve 13, to balance the internal pressure of the battery box 1 with the external pressure.

In the present embodiment, the coolant 11 is trimethyl phosphate, and the barrier liquid is transformer oil.

Embodiment 3

Referring to FIG. 1, the present application discloses a battery pack which includes a battery module 2, a coolant 11 and a battery box 1. The internal pressure in the battery box 1 is 1.5 bar. The battery module 2 consists of battery cells, and the battery module 2 is disposed in the battery box 1. The coolant 11 is filled into the battery box 1, such that the battery module 2 is immersed in the coolant 11. Then, a barrier liquid is added to form a sealing layer 12 covering on the coolant 11. The sealing layer 12 covering on the coolant 11 can have a thickness of 1 mm, to avoid the volatilization loss of the coolant 11 for achieving a liquid sealing effect.

In the present embodiment, the coolant 11 is hydrofluoroether, and the barrier liquid is silicone oil.

Embodiment 4

Referring to FIG. 2, the present application discloses a battery pack which includes a battery module 2, a coolant 11 and a battery box 1. The internal pressure in the battery box 1 is 3 bar. The battery module 2 consists of battery cells, and the battery module 2 is disposed in the battery box 1. The battery module 2 is placed upside down in the battery box 1.

The coolant 11 is filled into the battery box 1, such that the electrode tabs of the battery module 2 are immersed in the coolant 11. Then, a barrier liquid is added to form a sealing layer 12 covering on the coolant 11. The sealing layer 12 covering on the coolant 11 can have a thickness of 1.5 mm, to avoid the volatilization loss of the coolant 11 for achieving a liquid sealing effect.

The battery box is provided with a breathing valve 13, to balance the internal pressure of the battery box 1 with the external pressure.

In the present embodiment, the coolant 11 is trichloromethane, and the barrier liquid is transformer oil.

Embodiment 5

Referring to FIG. 2, the present application discloses a battery pack which includes a battery module 2, a coolant 11 and a battery box 1. The internal pressure in the battery box 1 is 5 bar. The battery module 2 consists of battery cells, and the battery module 2 is disposed in the battery box 1. The battery module 2 is placed upside down in the battery box 1.

The coolant 11 is filled into the battery box 1, such that the electrode tabs of the battery module 2 are immersed in the coolant 11. Then, a barrier liquid is added to form a sealing layer 12 covering on the coolant 11. The sealing layer 12 covering on the coolant 11 can have a thickness of 1 mm, to avoid the volatilization loss of the coolant 11 for achieving a liquid sealing effect.

The battery box is provided with a breathing valve 13, to balance the internal pressure of the battery box 1 with the external pressure.

In the present embodiment, the coolant 11 is trichloromethane, and the barrier liquid is transformer oil.

Embodiment 6

Figure 3:
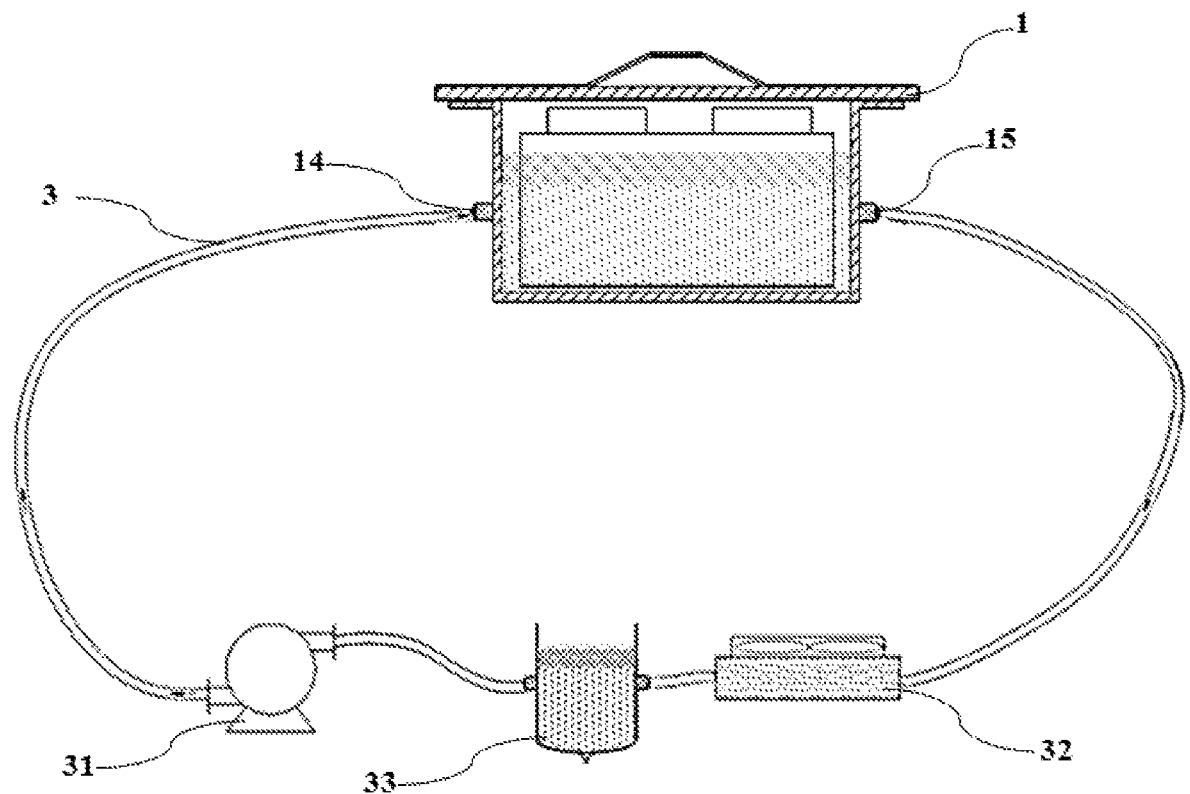
FIG. 3 is a schematic view of a battery pack system of the present application.

Referring to FIG. 3, the present application discloses a battery pack system which includes the battery pack as shown in FIG. 1. The battery pack includes a battery module 2, a coolant 11 and a battery box 1. The internal pressure in the battery box 1 is 3 bar. The battery module 2 consists of battery cells, and the battery module 2 is disposed in the battery box 1. The coolant 11 is filled into the battery box 1, such that the electrode tabs of the battery module 2 are immersed in the coolant 11. Then, a barrier liquid is added to form a sealing layer 12 covering on the coolant 11. The sealing layer 12 covering on the coolant 11 can have a thickness of 2 mm, to avoid the volatilization loss of the coolant 11 for achieving a liquid sealing effect.

The battery box 1 is provided with a coolant inlet 14 and a coolant outlet 15. The battery box 1, the circulating pump 31, the heat exchanger 32 and the buffer tank 33 are connected together using the circulating pipeline 3. The coolant 11 flows into the battery box 1 from the coolant inlet 14, and flows out from the coolant outlet 15. The coolant 11 realizes cooling or heating by using the circulating pipeline 3, the circulating pump 31 and the heat exchanger 32.

Figure 4:
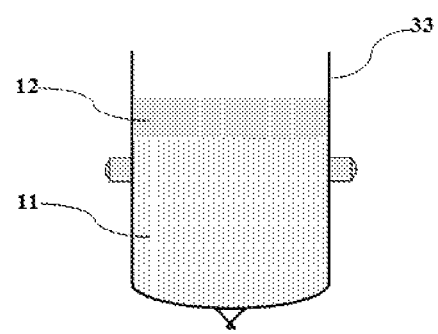
FIG. 4 is a schematic view of a buffer tank of the present application.
Figure 5:
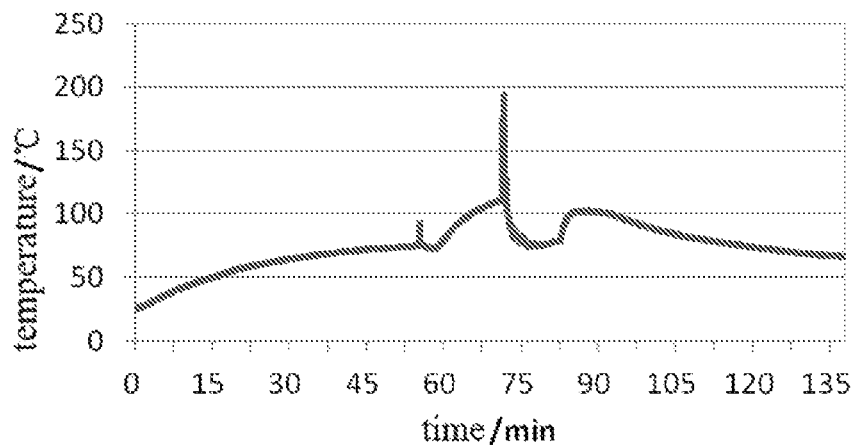
FIG. 5 is a schematic diagram showing the temperature curve when thermal runaway occurs in the battery pack of the present application.
Figure 6:
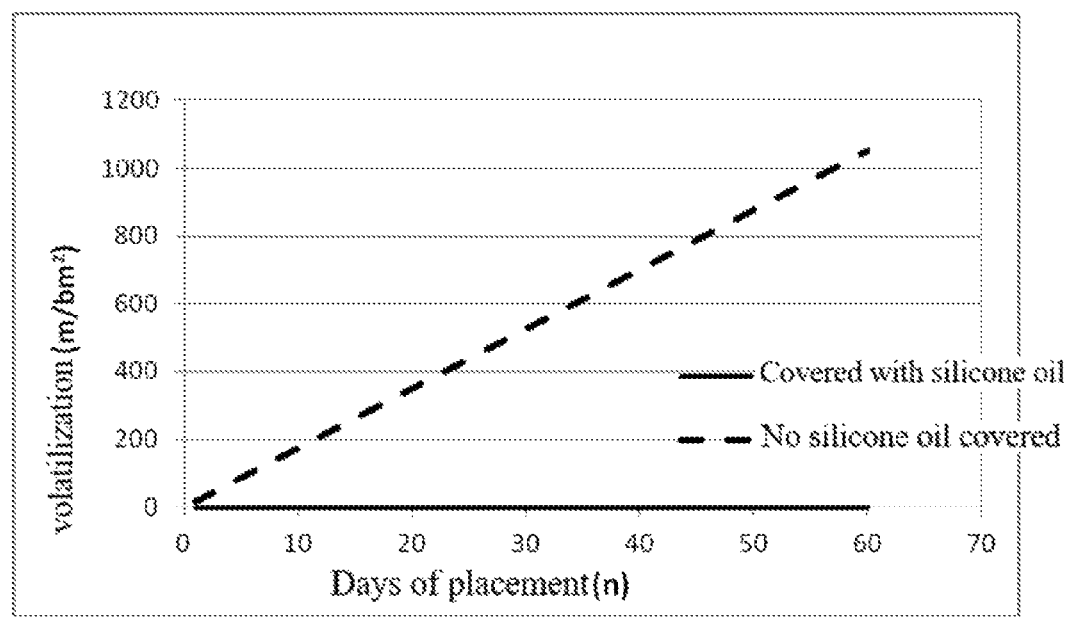
FIG. 6 is a schematic diagram showing the comparative data of volatilization loss of the coolant after 60 days when the battery pack of the present application is covered with silicone oil and without silicone oil.

Referring to FIG. 4, the buffer tank 33 has an opened structure, the buffer tank 33 is filled with the coolant 11, and another sealing layer 12 containing the barrier liquid is covered on the coolant 11 of the buffer tank 33.

In the present embodiment, the coolant 11 is trichloromethane, and the barrier liquid is transformer oil.

What is claimed is:

1. A battery pack comprising a battery module, a coolant and a battery box, the battery module and the coolant being disposed in the battery box, the battery module being at least partially immersed in the coolant, wherein a vaporization starting temperature of the coolant is between 70 Celsius degree and 200 Celsius degree, a sealing layer containing a barrier liquid is covered on the coolant, the barrier liquid and the coolant are immiscible, the density of the barrier liquid is less than the density of the coolant, and the barrier liquid will not vaporize at a temperature below 200 Celsius degree.

2. The battery pack of claim 1, wherein the coolant contains a liquid having flame-retardant, insulating and anti-electrolyzation property.

3. The battery pack of claim 2, wherein the vaporization starting temperature of the coolant is between 70 Celsius degree and 150 Celsius degree.

4. The battery pack of claim 3, wherein the vaporization starting temperature of the coolant is between 100 Celsius degree and 150 Celsius degree.

5. The battery pack of claim 3, wherein the vaporization starting temperature of the coolant is between 70 Celsius degree and 130 Celsius degree.

6. The battery pack of claim 5, wherein the vaporization starting temperature of the coolant is between 100 Celsius degree and 130 Celsius degree.

7. The battery pack of claim 5, wherein the coolant is at least one selected from trichloromethane and hydrofluoroether.

8. The battery pack of claim 1, wherein the coolant is at least one selected from trimethyl phosphate and tripropyl phosphate.

9. The battery pack of claim 1, wherein the barrier liquid will not vaporize at a temperature below 150 Celsius degree.

10. The battery pack of claim 1, wherein a density difference between the coolant and the barrier liquid is greater than 0.3 kg/L.

11. The battery pack of claim 1, wherein the sealing layer has a thickness greater than 0.5 mm.

12. The battery pack of claim 1, wherein the barrier liquid is at least one selected from silicone oil and transformer oil.

13. The battery pack of claim 1, wherein the battery box is provided with a breathing valve.

14. A battery pack system comprising the battery pack of claim 1, wherein the battery pack system further includes an external circulating system, the external circulating system is connected to the battery box through a circulating pipeline, and the coolant in the battery box is circulated through the external circulating system.

15. The battery pack system of claim 14, wherein the external circulating system includes a circulating pump, a heat exchanger, a buffer tank and a circulating pipeline, wherein the battery box, the circulating pump, the heat exchanger and the buffer tank are connected together using the circulating pipeline.

16. The battery pack system of claim 15, wherein the buffer tank has an opened structure, the buffer tank is filled with the coolant, and another sealing layer containing the barrier liquid is covered on the coolant of the buffer tank.

17. The battery pack of claim 1, wherein the sealing layer has a thickness of from 0.5 mm to 2.0 mm.

18. The battery pack of claim 1, wherein the battery module is placed upside down in the battery box such that the electrode tabs of the battery module are immersed in the coolant.

* * * * *